US009192261B2

(12) United States Patent
Katz et al.

(10) Patent No.: US 9,192,261 B2
(45) Date of Patent: Nov. 24, 2015

(54) FRENCH PRESS COFFEE MAKER WITH SPENT GROUNDS REMOVAL

(75) Inventors: Paul Katz, New York, NY (US); Goeran Jerstroem, Glen Ridge, NJ (US)

(73) Assignee: Helen of Troy Limited, Belleville, St. Michael (BB)

( * ) Notice: Subject to any disclaimer, the term of this patent is extended or adjusted under 35 U.S.C. 154(b) by 141 days.

(21) Appl. No.: 13/980,165

(22) PCT Filed: Feb. 10, 2012

(86) PCT No.: PCT/US2012/024631
§ 371 (c)(1),
(2), (4) Date: Jul. 17, 2013

(87) PCT Pub. No.: WO2012/115801
PCT Pub. Date: Aug. 30, 2012

(65) Prior Publication Data
US 2013/0284030 A1    Oct. 31, 2013

Related U.S. Application Data

(60) Provisional application No. 61/445,299, filed on Feb. 22, 2011.

(51) Int. Cl.
A47J 31/38    (2006.01)
A47J 31/18    (2006.01)
A47J 31/20    (2006.01)

(52) U.S. Cl.
CPC *A47J 31/38* (2013.01); *A47J 31/18* (2013.01); *A47J 31/20* (2013.01)

(58) Field of Classification Search
CPC ............ A47J 31/20; A47J 31/02; A47J 31/38
USPC ...................................... 99/297, 319; 426/80
See application file for complete search history.

(56) References Cited

U.S. PATENT DOCUMENTS

| | | | | |
|---|---|---|---|---|
| 376,319 | A * | 1/1888 | Lane | 99/297 |
| 2,311,759 | A | 2/1943 | Johnson | |
| 2,749,834 | A * | 6/1956 | Hiscock | 99/287 |
| 3,307,474 | A | 3/1967 | Kasher | |
| 4,948,601 | A | 8/1990 | Serbu | |
| 5,544,566 | A * | 8/1996 | Bersten | 99/287 |
| 5,979,299 | A | 11/1999 | Hornsby et al. | |
| 6,422,133 | B1 * | 7/2002 | Brady | 99/297 |
| 6,692,780 | B1 * | 2/2004 | Sandin | 426/77 |
| 8,074,561 | B2 | 12/2011 | Galbis | |
| 2007/0151461 | A1 | 7/2007 | Edmark et al. | |
| 2008/0168906 | A1 | 7/2008 | Pan et al. | |
| 2009/0071343 | A1 | 3/2009 | Helde | |

FOREIGN PATENT DOCUMENTS

WO    96/05760    2/1996

OTHER PUBLICATIONS

International Search Report filed in PCT/US2012/024631.

* cited by examiner

*Primary Examiner* — Reginald L Alexander
(74) *Attorney, Agent, or Firm* — Rankin, Hill & Clark LLP

(57) ABSTRACT

A French press coffee maker includes a carafe, a plunger, and a ladle. The carafe includes a base wall and an upwardly extending generally cylindrical side wall. The plunger includes a rod and a piston connected to the rod. The piston is movable with respect to the carafe in an axial direction. The ladle includes a base having a peripheral rim and an upwardly extending arm connected with the base.

19 Claims, 4 Drawing Sheets

FRENCH PRESS COFFEE MAKER WITH SPENT GROUNDS REMOVAL

BACKGROUND

Typically, a French press coffee maker, which may also be referred to as a press pot, coffee press, coffee plunger, or cafetière, includes a glass carafe having a cylindrical shape, a lid and a plunger that fits tightly inside the carafe. The plunger includes a fine wire mesh that operates as a filter. Coarsely ground coffee beans are placed inside the carafe and hot water is poured into the carafe. After the coffee steeps for a few minutes, the plunger is depressed toward the bottom of the carafe to separate the coffee grounds from the drinkable liquid coffee.

Disposing of the spent coffee grounds on the bottom of the carafe can be difficult. The carafe can be rinsed with water and then the contents can be dumped in a sink. A large spoon can be used to scoop and scrape the spent grounds from the bottom of the carafe. Other complicated mechanisms to remove the spent coffee grounds include a basket that fits the bottom of the carafe and is supported by four vertical, evenly spaced bars held together by a band at the top. The basket supported by the four vertical, evenly spaced bars held together by the band at the top fits inside the carafe, and when removed from the carafe also removes all solid materials inside the carafe and leaves the liquid within the carafe. Systems have also been developed where a plate sits on the bottom of the carafe. The coffee grounds are placed on top of the plate and water is poured into the carafe. After the coffee steeps and the plunger having the filter is displaced to separate the solids from the liquid, the plate can be lifted out of the carafe removing the spent coffee grounds. These systems can be complicated and still may not adequately remove the spent coffee grounds from the carafe.

SUMMARY

An example of a French press coffee maker assembly that can overcome at least one of the aforementioned shortcomings includes a plunger mechanism and ladle. The plunger mechanism includes a plunger and a lid. The plunger includes a rod and a piston connected to the rod. The lid includes an opening that receives the rod of the plunger and a notch extending inwardly from a peripheral edge of the lid. The piston is movable with respect to the lid in an axial direction. The ladle includes a base and an upwardly extending arm connected with the base. The arm of the ladle is received in the notch in the lid when the base of the ladle is disposed beneath the piston and a center of the base is aligned with a center of the piston.

An example of a French press coffee maker includes a carafe, a plunger, and a ladle. The carafe includes a base wall and an upwardly extending generally cylindrical side wall surrounding a central axis. The plunger includes a rod and a piston connected to the rod. The piston is movable with respect to the carafe in an axial direction. The ladle includes a base having a peripheral rim and an upwardly extending arm connected with the base. The ladle is configured to be received in the carafe such that the peripheral rim of the base contacts the side wall of the carafe and the arm extends from the base toward the upper edge of the carafe and is disposed adjacent to the side wall of the carafe. When the ladle is properly positioned in the carafe, the arm of the ladle is thinnest measured along the radius of the generally cylindrical side wall and is curved to generally follow the radius the generally cylindrical side wall.

Another example of a French press coffee maker also includes a carafe, a plunger, and a ladle. The carafe includes a base wall and an upwardly extending side wall surrounding a central axis. The plunger includes a rod and a piston connected to the rod. The piston is moveable with respect to the carafe in an axial direction from a first position where the piston is disposed adjacent an upper edge of the carafe toward a second position where the piston is disposed adjacent the base wall of the carafe. The ladle includes a base having a peripheral rim and an upwardly extending arm connected with the base. The ladle is configured to be received in the carafe such that the arm extends from the base toward an upper edge of the carafe and is disposed adjacent the side wall of the carafe. The ladle is also configured to be received in the carafe such that the peripheral rim of the base contacts the side wall of the carafe and is disposed between the arm of the ladle and the side wall of the carafe when the ladle is positioned in the carafe with the base of the ladle adjacent the base wall of the carafe.

Yet another example of a French press coffee maker includes a carafe, a plunger, and a ladle. The carafe includes a base wall and an upwardly extending side wall. The plunger includes a rod and a piston connected to the rod. The piston is received in the carafe and moveable with respect to the carafe from a first position where the piston is disposed adjacent an upper edge of the carafe toward a second position where the piston is disposed adjacent to the base wall of the carafe. The ladle includes a base and an upwardly extending arm connected with the base. The base includes a rigid section and a flexible peripheral section connected with the rigid section. The ladle is configured to be received in the carafe such that a peripheral rim of the flexible peripheral section contacts the side wall of the carafe and the arm extends from the base toward the upper edge of the carafe.

DETAILED DESCRIPTION

Figure 1:
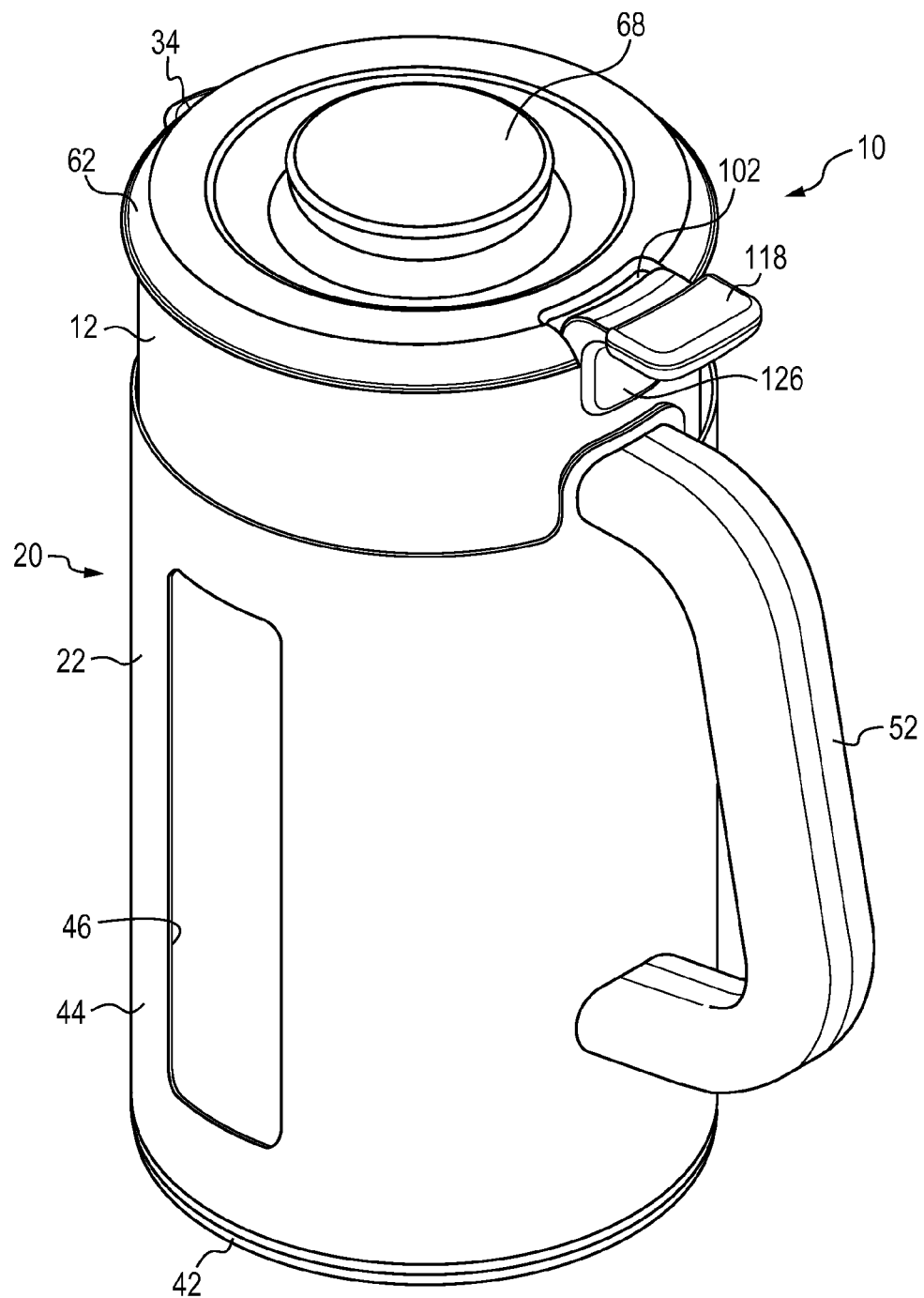
FIG. 1 is a perspective view of a French press coffee maker.
Figure 2:
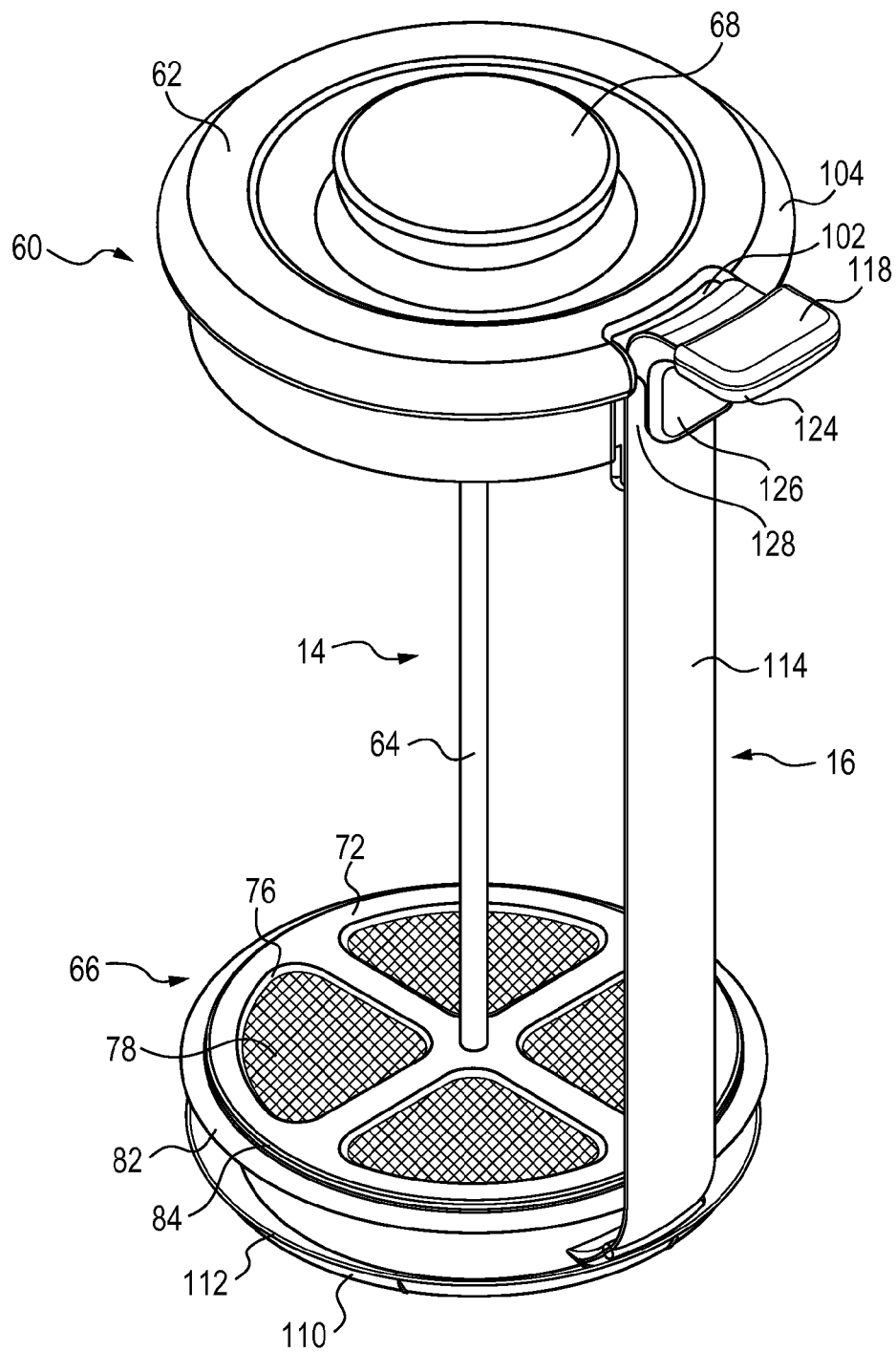
FIG. 2 is a perspective view of a French press coffee maker assembly including a plunger mechanism and a ladle for use with the French press coffee maker depicted in FIG. 1.

FIG. 1 depicts a French press coffee maker (hereinafter simply referred to as a "French press") 10. Although some skilled in the art may differentiate a French press from a press pot, a coffee press, a coffee plunger or a cafetière, as used herein these terms have the same meaning and may be used interchangeably. With reference to FIGS. 1 and 2, the French press 10 generally includes a carafe 12, a plunger 14, and a ladle 16.

Figure 3:
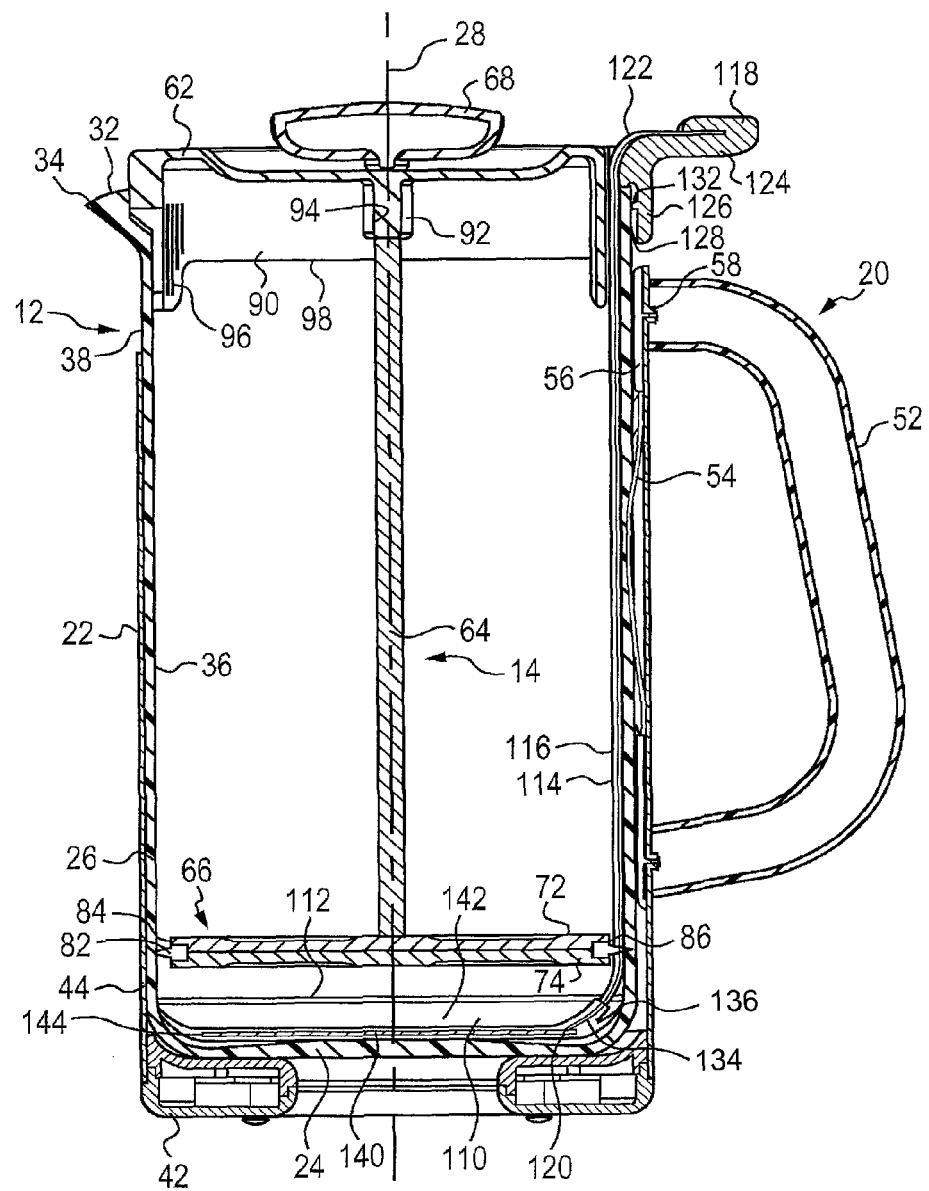
FIG. 3 is a cross-sectional view of the French press coffee maker depicted in FIG. 1.

The carafe 12 can be part of a container assembly 20, which includes the carafe 12 and a housing 22. The carafe 12 in the illustrated embodiment is made from glass; however, the carafe could be made another suitable material in which coffee could steep. With reference to FIG. 3, the carafe 12 in the illustrated embodiment includes a base wall 24, which is circular, and an upwardly extending generally cylindrical side wall 26. The carafe 12 can take other configurations, e.g., the base wall could be rectangular and the side wall could also be rectangular when viewed from a top of the carafe. With reference back to the illustrated embodiment, the side wall 26 of the carafe 12 surrounds a central axis 28. The base wall 24 of the carafe 12 is centered on the central axis 28. The carafe 12 has an upper edge 32 opposite the base wall 24. A spout 34 is formed at the upper edge 32 to facilitate pouring liquid from the carafe 12. The carafe 12 also includes an internal surface 36 that cooperates with the plunger 14 and an external surface 38 that cooperates with the housing 22.

The container assembly 20 also includes the housing 22, which is configured to receive the carafe 12. The housing 22 includes a base 42, which can be made from a plurality of components. The base 42 is generally circular in the illustrated embodiment and is centered about the central axis 28. The housing 22 further includes a cylindrical side wall 44 that extends upwardly from the base 42. The side wall 44 of the housing 22 in the illustrated embodiment is made from stainless steel; however, other materials could be used. With reference back to FIG. 1, the side wall 44 of the housing 22 can include openings 46 (only one is visible in FIG. 1). These openings 46 can allow a user of the French press 10 to view graduation markings (not shown) found on the carafe 12 to aid in measuring the desired amount of coffee to be brewed with the French press.

With reference back to FIG. 3, the container assembly 20 further includes a handle 52, a spring 54, and a spring retainer 56. With reference back to FIG. 1, the handle 52 attaches to the side wall 44 of the housing 22. The handle 52 is angularly spaced about 90 degrees from the opening 46 formed in the side wall 44 of the housing 22. In the illustrated embodiment, the handle 52 is formed of plastic, which is less heat conductive than the stainless steel side wall 44 of the housing 22. With reference back to FIG. 3, fasteners 58 are used to connect the handle 52 to the housing 22. The handle 52 can attach to the housing 22 in other conventional manners.

With continued reference to FIG. 3, the spring 54 allows the carafe 12 to fit snuggly within the housing 22. In the illustrated embodiment, the spring 54 is a leaf-type spring that urges the carafe 12 in a direction generally perpendicular to the central axis 28 to retain the carafe 12 against a section of the side wall 44 of the housing 22 opposite the handle 52. The spring 54 is disposed inside the housing 22 and the handle 52 is disposed outside of the housing 22. The spring retainer 56 sandwiches opposite ends of the spring 54 against the side wall 44 of the housing 22. The spring retainer 56 attaches to the side wall 44 of the housing 22 using the same fasteners 58 that attach the handle 52 to the housing 22.

With reference back to FIG. 2, the plunger 14 can be part of a plunger mechanism 60 that includes the plunger 14 and a lid 62. The plunger 14 includes a rod 64, a piston 66 connected at a lower end of the rod 64, and a handle 68 connected to an upper end of the rod 64. The handle 68 is what is grasped by a user to manipulate the plunger 14. The piston 66 is moveable with respect to the carafe 12 and the lid 62 in an axial direction, which is parallel to the central axis 28 (FIG. 3). More specifically, the piston 66 is moveable with respect to the carafe 12 in the axial direction from a first position where the piston is disposed adjacent the upper edge 32 of the carafe 12 toward a second position (shown in FIG. 3) where the piston 66 is disposed adjacent, but slightly offset from, the base wall 24 of the carafe 12.

The piston 66 includes a frame, which can include an upper frame member 72 connected with the lower frame member 74. In the illustrated embodiment, the frame 72, 74 is generally circular having a diameter slightly less than the diameter of the cylindrical side wall 26 of the carafe 12. The frame 72, 74 also includes large openings 76. The piston 66 further includes a wire mesh 78 sandwiched between the upper frame member 72 and the lower frame member 74. The wire mesh 78 can operate as a filter similar to a conventional French press.

The frame 72, 74 is made from a rigid material, such as a rigid plastic or metal. The piston 66 also includes a peripheral gasket 82 connected with an outer edge 84 of the frame 72, 74. In the illustrated embodiment, the outer edge 84 is circular. The peripheral gasket 82 can be made from a flexible material, which is more flexible than the frame 72, 74. The gasket 82 contacts the internal surface 36 of the cylindrical side wall 26 of the carafe 12 as the piston 66 moves with respect to the carafe. The wire mesh 78 (or other filter member) allows water to pass through the openings 76 in the frame. The peripheral gasket 82 and the remainder of the piston 66 preclude solid materials larger than the openings in the wire mesh 78 to flow through the openings 76 in the frame 72, 74. The peripheral gasket 82 shown in FIGS. 2 and 3 is a single gasket; however, a double gasket could also be used. Moreover, the frame 72, 74 may include a channel 86 (FIG. 3) formed along the outer circular edge 84 of the frame. The peripheral gasket 82 can be received in the channel 86. The peripheral gasket 82 can also be removable from the channel 86 for cleaning.

The plunger mechanism 60 also includes the lid 62 for covering the carafe 12. The lid 62 includes a downwardly depending cylindrical shroud 90 and a downwardly depending cylindrical boss 92. The shroud 90 is near a peripheral edge 104 of the lid 62 so that shroud 90 is received within the carafe 12 when the lid 62 is properly positioned on the carafe 12, which is shown in FIG. 3. The downwardly depending cylindrical boss 92 is centrally disposed to define an opening 94 that receives the rod 64 of the plunger 14. The rod 64 of the plunger 14 is movable within the opening 94 between the first position and the second position, which is shown in FIG. 3. The shroud 90 also includes slots 96 formed through the shroud 90. As more clearly seen in FIG. 3, a lower edge 98 of the shroud 90 is disposed beneath the spout 34 formed in the carafe 12. To allow for liquid to exit the carafe 12 through the spout 34 with the lid 62 disposed on the carafe 12, the slots 96 are aligned with the spout. If desired, the lid 62 can be rotated so that the slots 96 no longer align with the spout 34, which can inhibit liquid from pouring out of the carafe 12 with the lid 62 in this orientation.

With reference back to FIG. 2, the lid 62 also includes a notch 102 extending inwardly from a peripheral edge 104 of the lid. The notch 102 is diametrically opposed (angularly spaced 180 degrees from) the slots 96 in the shroud 90 of the lid 62. The notch 102 in the lid 62 cooperates with the ladle 16 in a manner that will be described in more detail below.

Figure 4:
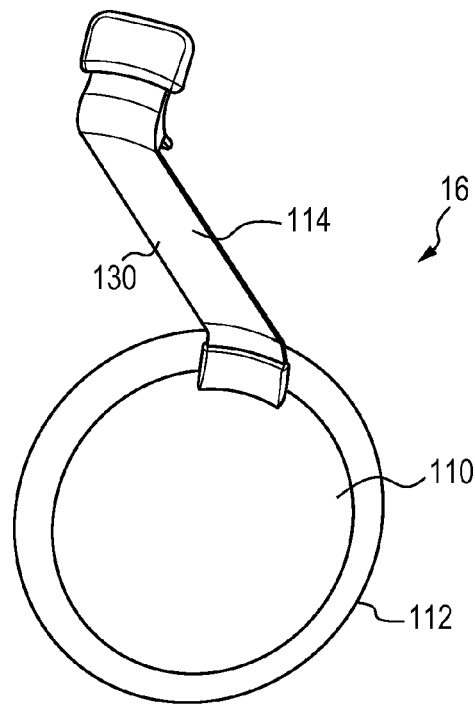
FIG. 4 is a perspective view of the ladle for the French press coffee maker depicted in FIG. 1.
Figure 5:
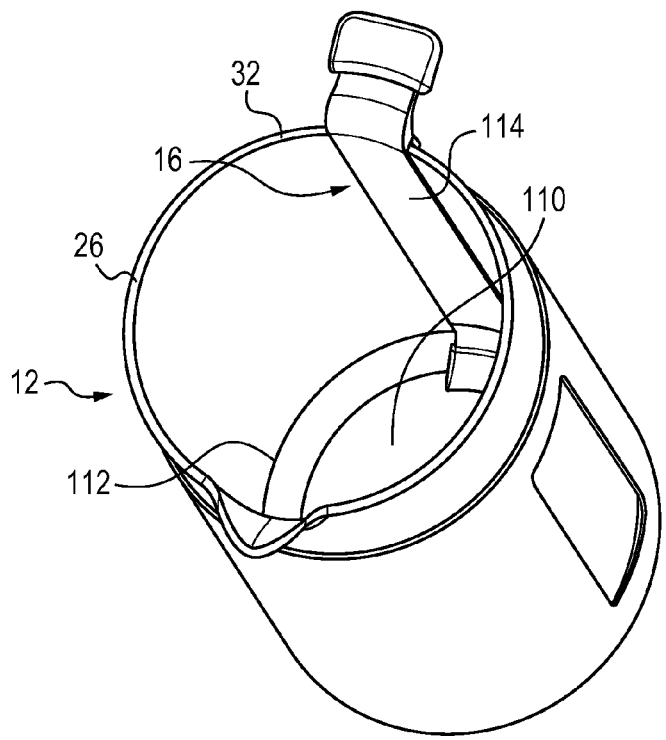
FIG. 5 is a perspective view of the ladle shown in FIG. 1 disposed in a carafe of the French press coffee maker depicted in FIG. 1.

With reference to FIG. 4, the ladle 16 includes a base 110 having a peripheral rim 112 and an upwardly extending arm 114 connected with the base 110 at a lower end portion 120 of the arm. As seen in FIGS. 2 and 3, the arm 114 of the ladle 16 is received in the notch 102 in the lid 62 when the base 110 of the ladle is disposed beneath the piston 66 and a center of the base is aligned with a center of the piston. As seen in FIG. 5, the ladle 16 is configured to be received in the carafe 12. The ladle 16 is received in the carafe 12 such that the peripheral rim 112 of the base 110 contacts the side wall 26 of the carafe 12 and the arm 114 extends from the base 110 toward the upper edge 32 of the carafe 12 and the arm 114 is disposed adjacent to the side wall 26 of the carafe 12.

In the illustrated embodiment, the arm 114 of the ladle 16 is made from spring steel. The arm 114 can be formed or stamped from a thin sheet of spring steel; however, other suitable materials can also be used. The arm 114 is generally an elongate rectangular configuration. The arm could take another configuration, such as similar to the rod 64 of the plunger 14. With reference back to the illustrated embodiment, when the ladle 16 is positioned within the carafe 12 as shown in FIGS. 3 and 5, the arm 114 of the ladle 16 is thinnest measured along the radius of the generally cylindrical side wall 26 of the carafe 12. This allows the piston 66 to operate in such a manner where the gasket 82 of the piston 66 contacts both an inner surface 116 of the arm 114 and the internal surface 36 of the carafe 12 when the plunger is moving toward the second position, which is shown in FIG. 3. This allows the arm 114 of the ladle 16 to be disposed adjacent to the side wall 26 of the carafe 12 which can facilitate easier removal of the ladle 16 from the carafe as compared to known grounds removal devices.

The section of the arm 114 of the ladle 16 that is disposed adjacent the side wall 26 of the carafe 12, which is a majority of the arm 114 in the illustrated embodiment, is also curved (in a plane normal to the central axis 28) to generally follow the radius of the generally cylindrical side wall 26 of the carafe 12. The arm 114 of the ladle 16 is also curved to generally follow the radius of the base 110. This curvature of the arm 114 also allows the desirable interaction between the gasket 82 of the piston 66 and both the inner surface 116 of the arm 114 and the internal surface 36 of the carafe 12 when the piston 66 is moving toward the second position. Where the arm of the ladle 16 takes an alternative configuration, the piston 66 can include a notch (not shown) and the arm can be received in this notch when the plunger 14 and the ladle 16 are received in the carafe 12.

With reference back to FIGS. 1 and 2, when the lid 62 is properly positioned on the carafe 12, the arm 114 of the ladle 16 is disposed in the notch 102. More particularly, when the ladle 16 is positioned in the carafe 12 with the base 110 of the ladle adjacent the base wall 24 of the carafe 12, the arm 114 of the ladle 16 can be positioned within the notch 102 formed in the lid 62. As such, the notch 102 can cooperate with the arm 114 of the ladle 16 to provide a locating feature for positioning the lid 62 on the carafe 12.

The ladle 16 also includes a handle portion 118 connected with an upper end portion 122 of the arm 114, which is opposite the base 110. The handle portion 118 includes a grip 124 extending outwardly beyond the upper edge 32 of the carafe 12 and a retaining lip 126 extending downwardly from the grip 124. The retaining lip 126 is offset radially from the arm 114 to define a gap 128 for receiving the side wall 26 of the carafe 12 when the ladle 16 is positioned in the carafe 12 with the base 110 of the ladle adjacent the base wall 24 of the carafe. The handle portion 118 also includes a protuberance 132 extending inwardly toward the side wall 26 of the carafe 12 from the retaining lip 126. The protuberance 132 engages the outer surface 38 of the side wall 26 of the carafe 12 when the ladle 16 is positioned in the carafe 12 with the base 110 of the ladle adjacent the base wall 24 of the carafe. The handle portion 118 of the ladle 16 can be made of plastic to provide insulative material between the spring steel of the arm 114 of the ladle 16 and the hand of the operator who manipulates the ladle.

The ladle 16 and the plunger 14 are configured such that the base 110 of the ladle 16 is disposed between the piston 66 of the plunger 14 and the base wall 24 of the carafe 12 while coffee is brewing in the French press 10. Also, as can be seen in FIG. 3, the ladle 16 is configured such that the peripheral rim 112 of the base 110 contacts the side wall 26 of the carafe 12 and is disposed between the arm 114 of the ladle 16 and the side wall 26 of the carafe 12 when the ladle 16 is positioned in the carafe 12 with the base 110 of the ladle 16 adjacent the base wall 24 of the carafe 12. As seen in FIG. 3, the peripheral rim 112 of the base 110 is also offset, or spaced from, from the arm 114 between the arm 114 of the ladle 16 and the side wall 26 of the carafe 12. Accordingly, even though the arm 114 of the ladle 16 contacts the side wall 26 of the carafe 12, the entire peripheral rim 112 of the base 110 of the ladle 16, or at least a majority of the peripheral rim 112, is in contact with the internal surface 36 of the carafe 12. This inhibits and/or precludes coffee grounds from traveling between the base 110 of the ladle 16 and the side wall 26 of the carafe. This also allows for the desirable sealing between the peripheral rim 112 and the side wall 26 of the carafe 12. As such, spent coffee grounds are retained on the base 110 of the ladle for easy removal after brewing. As more clearly seen in the lower right-hand corner of FIG. 3, the arm 114 of the ladle 16 can begin to curve away from the side wall 26 of the carafe 12 below a location on the arm 114 contacted by the piston 66 (or the gasket 82) when the piston is in the second position, which is shown in FIG. 3. This configuration allows for the peripheral rim 112 to contact the side wall 26 of the carafe 12 and be disposed between the arm 114 of the ladle 16 and the side wall 26 of the carafe 12 when the ladle 16 is positioned in the carafe 12 with the base 110 of the ladle 16 adjacent the base wall 24 of the carafe 12.

With reference to FIG. 4, the arm 114 of the ladle 16 includes a vertically oriented section 130, which is aligned with an offset section 132 (FIG. 3) of the peripheral rim 112 of the base 110. When viewed along the axial direction, the offset section 136 is offset from a curved lower section 134 of the arm 114 of the ladle 16.

In the illustrated embodiment, the base 110 of the ladle 16 is generally circular. The base 110 can include a rigid section, such as a rigid plate 140, which can be circular or disk-shaped, (FIG. 3) and a flexible section 142 attached to the rigid plate 140. The rigid plate 140 can be made of a metal similar to the arm 114. The lower end 120 of the arm 114 of the ladle 16 connects with and contacts the rigid plate 140 offset inwardly from the peripheral rim 112 of the base 110. This also allows the peripheral rim 112, which is also circular in the illustrated embodiment, to be disposed between the arm 114 of the ladle 16 and the internal surface 36 of the carafe 12. A periphery of the flexible section 142 forms the peripheral rim 112 of the base 110. The flexible section 142 can be a silicone material overmolded onto the rigid plate 140. The flexible section 142 can attach to an outer edge 144 of the rigid plate 140, or the rigid plate 140 can be completely encapsulated by the silicone material of the flexible section 142, which is shown in FIGS. 4 and 5.

With reference back to FIG. 3, the periphery of the flexible section 142, which in the illustrated embodiment is the peripheral rim 112, is disposed above an outer edge 144 of the rigid plate 140 when the ladle 16 is positioned in the carafe 12 with the base 110 of the ladle 16 adjacent to base wall 24 of the carafe 12. This allows the flexible section 142 of the base 110 to be generally cup-shaped to aid in retaining the coffee grounds on the base 110 of the ladle 16.

To remove ladle 16 from the carafe 12, an operator pulls upwardly on the grip 124 to disengage the protuberance 132 from the side wall 26 of the carafe 12. With retaining lip 126 and protuberance 132 disengaged from the side wall 26 of the carafe 12, the ladle 16 can be slightly pivoted or rocked so that the handle portion 118 is moved toward the spout 34 of the carafe 12 (per the orientation shown in FIG. 3). This movement is capable because of the connection between the arm 114 and the rigid plate 140 of the base 110. The lower curved section 134 of the arm 114 is curved about a radius so that the lower curved section of the arm, the section of the arm 114 below the full stroke of the piston 66 shown in FIG. 3, allows the ladle 16 to be rocked slightly. This rocking motion can disengage the peripheral rim 112 of the base 110 (the peripheral rim is flexible and can seal against the inner surface 36 of the carafe 12). As such, the peripheral rim 112 can disengage from the internal surface 36 of the carafe 12 for removal of the ladle 16 and the grounds retained thereon from the carafe 12.

To operate the French press 10, one inserts the plunger 14 into the carafe 12. The plunger 14 can be inserted such that the base 110 is disposed adjacent to base wall 24 of the carafe 12 and the retaining lip 126 and the protuberance 132 of the handle portion 118 engage the side wall 26 of the carafe 12. Ground coffee beans are then placed in the carafe 12 as is hot water. The ground coffee beans and hot water are allowed to steep for a few minutes. The plunger mechanism 60 including the lid 62 can be placed on to the carafe 12 while the coffee is steeping. After a few minutes, the plunger 14 can be depressed such that the piston 66 is moved from the first position where the piston is disposed adjacent the upper edge 32 of the carafe 12 toward the second position (shown in FIG. 3) where the piston is disposed adjacent the base wall 24 of the carafe 12. The liquid coffee can then be poured from the carafe through the slots 96 formed in the shroud 90 of the lid 62 and through the spout 34. After the liquid has been poured from the carafe 12, the plunger mechanism 60 can be removed from the carafe 12. Next, an operator pulls the grip 124 upwardly in the axial direction (parallel with the central axis 28). With the retaining lip 126 and protuberance 132 disengaged from the side wall 26 of the carafe 12, the handle portion 118 can be brought toward the spout 34, thus slightly pivoting the ladle. The ladle 16 can then be pulled out of the carafe.

A French press coffee maker assembly and a French press coffee maker have been described above in detail. Modifications and alterations will occur to those upon reading and understanding the preceding detailed description. The invention, however, is not limited to only the embodiments described above. Instead, the invention is broadly defined by the appended claims and the equivalents thereof.

The invention claimed is:

1. A French press coffee maker assembly comprising:
a plunger mechanism including a plunger and a lid, the plunger including a rod and a piston connected to the rod, the lid including an opening that receives the rod of the plunger and a notch extending inwardly from a peripheral edge of the lid, the piston being movable with respect to the lid in an axial direction; and
a ladle including a base and an upwardly extending arm connected with the base, wherein the arm of the ladle is received in the notch in the lid when the base of the ladle is disposed beneath the piston and a center of the base is aligned with a center of the piston, wherein the base of the ladle includes a rigid section and a flexible section attached to the rigid section, wherein a periphery of the flexible section forms a peripheral rim of the base.

2. The assembly of claim 1, wherein the arm of the ladle connects with and contacts the rigid section offset inwardly from the peripheral rim of the base.

3. The assembly of claim 2, wherein the arm includes a vertically oriented section aligned with an offset section of the peripheral rim of the base when viewed along the axial direction, wherein the offset section of the peripheral rim is offset from a curved lower section of the arm of the ladle.

4. The assembly of claim 1, wherein the periphery of the flexible section is disposed above an outer edge of the rigid section.

5. The assembly of claim 4, wherein the rigid section is encapsulated by the flexible section and flexible section is generally cup-shaped.

6. The assembly of claim 1, wherein the base of the ladle is circular and the arm of the ladle is thinnest measured parallel to a radius of the base and the arm is curved to generally follow the radius of the base.

7. The assembly of claim 6, wherein the piston includes a frame and a peripheral gasket connected with an outer edge of the frame, wherein the gasket contacts an inner surface of the arm when the base of the ladle is disposed beneath the piston and the center of the base is aligned with the center of the piston.

8. The assembly of claim 1, wherein the ladle includes a handle portion connected with an upper end portion of the arm, which is opposite the base, wherein the handle portion includes a grip extending from the arm and a retaining lip extending downwardly from the grip, the retaining lip being offset from a vertical section of the arm to define a gap for receiving a side wall of an associated carafe when the ladle is positioned in the associated carafe with the base of the ladle adjacent a base wall of the associated carafe.

9. A French press coffee maker comprising:
a carafe having a base wall and an upwardly extending side wall;
a plunger mechanism including a plunger and a lid, the plunger including a rod and a piston connected to the rod, the lid including an opening that receives the rod of the plunger and a notch extending inwardly from a peripheral edge of the lid, the piston being movable with respect to the lid in an axial direction, wherein the piston is receivable in and movable in the axial direction with respect to the carafe and when the piston is received in the carafe the piston contacts the side wall; and
a ladle including a base and an upwardly extending arm connected with the base, wherein the arm of the ladle is received in the notch in the lid when the base of the ladle is disposed beneath the piston and a center of the base is aligned with a center of the piston, wherein the base of the ladle is receivable in the carafe and when base is received in the carafe with the arm of the ladle received in the notch of the lid the base contacts the side wall.

10. The coffee maker of claim 9, wherein the base includes a peripheral rim, wherein the peripheral rim of the base contacts the side wall of the carafe and the arm extends from the base toward an upper edge of the carafe and is disposed adjacent the side wall of the carafe when the base of the ladle is received in the carafe and disposed adjacent the base wall of the carafe.

11. The coffee maker of claim 9, wherein the piston includes a frame and a peripheral gasket connected with an outer edge of the frame, wherein the gasket contacts both an inner surface of the arm and an internal surface of the carafe when the plunger and the ladle are disposed in the carafe.

12. The coffee maker of claim 9, wherein the ladle includes a handle portion connected with an upper end portion of the arm opposite the base, wherein the handle portion includes a grip extending outwardly beyond an upper edge of the carafe and a retaining lip extending downwardly from the grip, the retaining lip being offset from the arm to define a gap for receiving the side wall of the carafe when the ladle is positioned in the carafe with the base of the ladle adjacent the base wall of the carafe.

13. The coffee maker of claim 12, wherein the handle portion includes a protuberance extending inwardly toward the side wall of the carafe from the retaining lip, wherein the proteburance engages an outer surface of the side wall of the carafe when the ladle is positioned in the carafe with the base of the ladle adjacent the base wall of the carafe.

14. The coffee maker of claim 9, wherein the base of the ladle includes a rigid section and a flexible section attached to the rigid section, wherein a periphery of the flexible section forms a peripheral rim of the base.

15. A French press coffee maker comprising:
- a carafe having a base wall and an upwardly extending generally cylindrical side wall surrounding a central axis;
- a plunger including a rod and a piston connected to the rod, wherein the piston is movable with respect to the carafe in an axial direction; and
- a ladle including a base having a peripheral rim and an upwardly extending arm connected with the base, wherein the ladle is configured to be received in the carafe such that the peripheral rim of the base contacts the side wall of the carafe and the arm extends from the base toward an upper edge of the carafe and is disposed adjacent the side wall of the carafe, wherein the arm of the ladle is thinnest measured along a radius of the generally cylindrical side wall and is curved to generally follow the radius of the generally cylindrical side wall.

16. The coffee maker of claim 15, wherein the base includes a rigid section and a flexible section attached to the rigid section.

17. The coffee maker of claim 16, wherein the piston includes a frame and a peripheral gasket connected with an outer edge of the frame, wherein the gasket contacts both an inner surface of the arm and an internal surface of the carafe when the plunger is moving toward the second position.

18. The coffee maker of claim 15, further comprising a lid for covering the carafe, wherein the lid includes a notch extending inwardly from a peripheral edge, wherein the arm of the ladle is disposed in the notch when the lid is on the carafe and the ladle is positioned in the carafe with the base of the ladle adjacent the base wall of the carafe.

19. The coffee maker of claim 18, wherein the ladle includes a handle portion connected with an end portion of the arm opposite the base, wherein the handle portion includes a grip extending radially beyond an upper edge of the carafe and a retaining lip extending downwardly from the grip, the retaining lip being offset from the arm to define a gap for receiving the side wall of the carafe when the ladle is positioned in the carafe with the base of the ladle adjacent the base wall of the carafe.

* * * * *